US004001716B2

United States Statutory Invention Registration [19]

[11] Reg. Number: H1716

Rapp et al.

[45] Published: Apr. 7, 1998

[54] METHOD FOR PREPARING A CHEMICAL MIXTURE TO ENVIRONMENTAL SPECIFICATIONS

[76] Inventors: Larry Alan Rapp, 22655 Hidden Hills Rd., Yorba Linda, Calif. 92887; Shih-Chen Wang, 6041 Avon Ave., San Gabriel, Calif. 91775

[21] Appl. No.: 843,487

[22] Filed: Apr. 16, 1997

[51] Int. Cl.[6] ..... C10L 1/04

[52] U.S. Cl. ..... 208/17

*Primary Examiner*—Charles T. Jordan
*Assistant Examiner*—Meena Chelliah

[57] ABSTRACT

A method is provided for manufacturing a chemical mixture, such as a gasoline blend, which conforms to a set of regulations set by an outside public agency. The invention is directed to a set of regulations which require the manufacturer to prepare a master specification which sets control limits on the chemical characteristics of the chemical mixture and require that the master specification conform to a set of controlling criteria which are dependent upon such control limits—such as predicted exhaust pollution emissions from the burning of the subject gasoline blend. The method comprises the steps of: (a) blending quantities of chemical components to create a chemical mixture conforming to the controlling criteria, (b) analyzing the chemical mixture to determine the chemical characteristics of the chemical mixture, (c) preparing a test specification which conforms to the chemical characteristics of the chemical mixture, (d) determining whether the test specification conforms to the controlling criteria, and (e) accepting the test specification as the master specification if the determination in step (d) is positive.

15 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR PREPARING A CHEMICAL MIXTURE TO ENVIRONMENTAL SPECIFICATIONS

FIELD OF THE INVENTION

This invention relates generally to methods of preparing chemical mixtures to predetermined specifications, and specifically to methods of making gasoline to environmental specifications set by an outside public agency.

BACKGROUND

In the chemical processing industries, manufacturers routinely prepare chemical products to predetermined quality specifications. In the petroleum processing industries, for example, refiners have historically manufactured gasolines to specifications which included predetermined maximums or minimums for such characteristics as octane rating, vapor pressure and gum precursors.

In recent years, heightened concerns for the environment have prompted many outside public agencies to require chemical processors to produce many of their chemical products to additional specifications. In California, for example, the regulations of the California Air Resources Board ("CARB") now requires petroleum refiners to market all gasoline to predetermined specifications which include controls on such gasoline parameters as sulfur content, benzene content, total aromatics content, olefin content, oxygen content and heavy ends content. Meetings these new regulations while conducting efficient refining operations has been a challenge to California refiners.

To conform to the CARB regulations, refiners may meet a single comprehensive ("reference") specification setting absolute controls on each of the above-listed gasoline parameters. This specification is set forth in Title 13, California Code of Regulations, Sections 2262.1–2262.7. Gasolines meeting this specification are deemed to be environmentally acceptable.

Alternatively, the CARB regulations allow refiners to meet an "alternative" gasoline specification where such alternative specification is deemed to be no less acceptable to the environment than the corresponding CARB reference specification. The CARB regulations define environmental "acceptableness" by referencing three parameters related to the predicted exhaust emissions from the use of a gasoline blend in a hypothetical "average" vehicle on California streets and highways. These three parameters are: predicted $NO_x$ emissions, predicted hydrocarbon emissions and predicted total "potency weighted" emissions of benzene, 1,3-butadiene, formaldehyde and acetaldehyde ("toxics"). So long as the calculated value of these three parameters for an alternative specification does not exceed the calculated value of these three parameters for the reference specification—and so long as the alternative specification meets certain cap limits on sulfur content, benzene content, total aromatics content, olefin content, oxygen content and heavy ends content—the alternative specification is deemed environmentally acceptable.

In applying the new regulations, a refiner submits an alternative specification to CARB for CARB's review and records. With the submitted alternative specification, the refiner also submits the results of a calculation process set forth by CARB showing the predicted $NO_x$, total hydrocarbons and toxics emissions related to the alternative specification. Such predicted emissions must be equal to or better than the emissions predicted from the corresponding reference specification. The refiner is then authorized to market gasolines meeting the alternative specification. Thereafter, to be authorized to market gasolines conforming to a new alternative specification, the refiner must submit such new alternative specification to CARB—whereupon the former alternative specification is no longer authorized.

A refiner marketing gasoline to an alternative specification can attempt to operate so that every tank of blended gasoline conforms to each of the absolute ("flat") limits set forth in the alternative specification. Alternatively, CARB allows refiners to average one or more of the several controlled parameters over all gasoline sold during a running 90-day period. Such averaging procedure allows refiners to market individual gasoline lots which do not conform to one or more of the flat limits on the controlled parameters so long as the running 90 day average of such parameters for all gasoline sold by the refiner conforms to overall average limits. Under the CARB procedures, however, using the averaging procedure means having to meet a set of control limits which are more stringent than the control limits for non-averaging operation. Despite this fact, it is typical for present day California refiners to use the averaging option because it is believed to be too difficult to control day-to-day refinery operations so that every individual tank of blended gasoline conforms to flat limits on each controlled parameter. Having to use averaging, however, results in higher costs to the refiner and therefore higher pump prices to the consumer.

Accordingly, there is a need for a method of manufacturing a chemical mixture, such as a gasoline blend, while complying with CARB-like chemical processing regulations without having to resort to the more costly averaging options.

SUMMARY

The invention satisfies this need. In its most general sense, the invention is a method of manufacturing a chemical mixture which conforms to a particular set of regulations, wherein the mixture comprises a plurality of chemical components and wherein the mixture has a plurality of chemical characteristics. In the invention, the set of regulations requires that the manufacturer prepare a master specification which sets control limits on the chemical characteristics of the chemical mixture and requires that the master specification conform to a set of controlling criteria which are dependent upon such control limits. The method comprises the steps of: (a) blending quantities of chemical components to create a chemical mixture conforming to the controlling criteria, (b) analyzing the chemical mixture to determine the chemical characteristics of the chemical mixture, © preparing a test specification which conforms to the chemical characteristics of the chemical mixture, (d) determining whether the test specification conforms to the controlling criteria, and (e) accepting the test specification as the master specification if the determination in step (d) is positive, When the invention is applied to the manufacture of gasoline, the set of regulations can be CARB-like regulations, the plurality of chemical components are various hydrocarbon compounds generally having 5–10 carbon atoms, and the plurality of chemical characteristics can be sulfur content, benzene content, total aromatics content, olefin content, oxygen content and/or heavy ends content. The set of controlling criteria can be predicted $NO_x$, total hydrocarbon and/or "potency weighted" emissions of benzene, 1,3-butadiene, formaldehyde and acid acetaldehyde, as defined by the regulations.

In a typical application of the method, a gasoline refiner conducts refining operations in its traditional way, preparing its gasoline products using traditional blending recipes and techniques. However, the refiner further controls the blending operation so that each resultant gasoline blend meets the controlling criteria and conforms to at least one alternative specification acceptable to the outside governing authority. Typically this is most efficiently accomplished by inserting a suitable iteration routine into the refiner's existing blending control computer software. Using the method of the invention, therefore, the refiner can comfortably operate to "flat" specification limits set by the governing authority. The refiner does not have to resort to the use of averaging techniques—with their concomitant more limiting standards.

The method provides a means for more efficiently meeting product quality promulgated for the manufacture of chemical products, such as gasoline, by outside agencies, such as the California Air Resources Board. The method allows the chemical processor to efficiently produce environmentally acceptable lots of the controlled chemical product at minimum cost. Such efficiency reduces the unit cost of each lot of the chemical product, thereby reducing the cost of the product to consumers.

DETAILED DESCRIPTION OF THE INVENTION

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

The invention is a method of manufacturing a chemical mixture which conforms to a set of regulations, wherein the mixture comprises a plurality of chemical components, wherein the mixture has a plurality of chemical characteristics, and wherein the set of regulations requires the manufacturer to prepare a master specification which sets control limits on the chemical characteristics of the chemical mixture and requires that the master specification conform to a set of controlling criteria which are dependent upon such control limits. The method comprises the steps of: (a) blending quantities of chemical components to create a chemical mixture conforming to the controlling criteria; (b) analyzing the chemical mixture to determine the chemical characteristics of the chemical mixture; © preparing a test specification which conforms to the chemical characteristics of the chemical mixture; (d) determining whether the test specification conforms to the controlling criteria; and (e) accepting the test specification as the master specification if the determination in step (d) is positive.

The chemical mixture can be a mixture of gases or liquids. In a hydrocarbon chemical mixture, such as a gasoline blend, the chemical components of the mixture can be any of the wide variety of gasoline blend components, usually hydrocarbon molecules having between about 5 and about 10 carbon atoms.

The controlling criteria can be any criteria set by the controlling agency. Typically, such controlling criteria relate to environmental factors. Where the chemical mixture is a gasoline blend, typical controlling criteria include predicted emissions of various environmentally harmful materials, such as $NO_x$, total hydrocarbons, benzene, 1,3-butadiene, formaldehyde and acetaldehyde. The chemical characteristics of the chemical mixture can include such characteristics as sulfur content, benzene content, total aromatics content, olefin content, oxygen content and/or heavy ends content. Heavy ends content is often expressed in terms of the parameters "T50" and "T90," which is the temperature of a liquid mixture where 50% and 90%, respectively, of the mixture is vaporized.

The invention is particularly applicable to the refining of gasoline pursuant to the regulations of the California Air Resources Board ("CARB"), known commonly as the CARB Phase 2 Specifications. These specifications are set forth in the California Code of Regulations, including 13 C.C.R. §§ 2262-1–2262-7.

The CARB Phase 2 regulations establish a set of controlling criteria governing gasoline lots marketed within California. The CARB Phase 2 regulations define a "reference" gasoline blend, as set forth in Table 1, below.

TABLE 1

| Fuel Property | Units | Flat Limit | Averaging Limit | Cap Limit |
|---|---|---|---|---|
| Reid vapor pressure (RVP) | psi, max. | 7.00[1] | none | 7.00 |
| Sulfur (SUL) | ppmw, | 40 | 30 | 80 |
| Benzene (BENZ) | vol. %, max. | 1.00 | 0.80 | 1.20 |
| Aromatic HC (AROM) | vol. %, max. | 25.0 | 22.0 | 30.0 |
| Olefin (OLEF) | vol. %, max. | 6.0 | 4.0 | 10 |
| Oxygen (OXY) | wt. % | 1.8 (min) 2.2 (max) | none | 1.8 (min.)[2] 2.7 (max) |
| Temperature at 50% distilled (T50) | deg. F., | 210 | 200 | 220 |
| Temperature at 90% distilled (T90) | deg. F., | 300 | 290 | 330 |

[1]Applicable during the summer months identified in 13 CCR, sections 2262.1 (a) and (b).
[2]Applicable during the winter months identified in 13 CCR, section 2262.5 (a).

The CARB Phase 2 regulations allow refiners to market gasoline in California which meets each of the "flat" limits set forth in Table 1.

As an alternative to continuously meeting each flat limit for every lot of gasoline marketed, California refiners can employ the averaging procedures set forth in the CARB regulations. By such averaging procedures, a refiner can give notice to CARB that it intends to market gasoline wherein some of the control parameters conform to the flat limits set forth in Table 1 and the remaining control parameters conform to the less stringent "cap" limits set forth in Table 1. For those gasoline parameters which the refiner wishes only to be limited to the cap limits, the refiner must manufacture its gasoline such that, on a 90-day running average, the average of each such cap-limited parameter for all gasoline marketed by the refiner meets the more stringent "averaging" limit set forth in Table 1.

By this averaging procedure, therefore, a refiner gains some flexibility over those product parameters which it cannot always meet on a day-to-day basis. As a trade-off for being allowed to use this averaging procedure, however, the refiner must conform all of its gasoline production during each running 90-day period to averaging limits which are more restrictive than the corresponding flat limits.

For example, a refiner can give notice to CARB that it intends to market gasoline wherein each lot meets all of the flat limits set forth in Table 1 except the aromatics content parameter, for which the refinery intends to use the averaging procedure. Thereafter, during each running 90-day period, each lot of the refiner's gasoline must meet each of the flat limits set forth in Table 1, except for aromatics content, which must always meet the cap limit (30.0 volume percent maximum). However, during each 90-day period, the running average of the aromatics content of all gasolines sold by that refiner must be less than the averaging limit set forth in Table 1 (22.0 volume percent).

As an alternative to meeting the limits set forth in Table 1, the CARB regulations allow California refiners to market gasoline to an acceptable "alternative" specification. Each such acceptable alternative specification must be disclosed to CARB (prior to the marketing of any gasoline pursuant to the alternative specification) alternative flat or averaging limits for each of the fuel properties listed in Table 1.

Such alternative specification will be deemed an acceptable master specification for use by the refiner if, using the limits set forth in the alternative specification, the predicted exhaust emissions of $NO_x$, the predicted emissions of total hydrocarbons and the "potency weighted" emissions of benzene, 1,3-butadiene, formaldehyde and acetaldehyde are less than or equal to corresponding exhaust emissions from a prototypical "reference" gasoline blend meeting the Phase 2 regulations set forth in Table 1. The potency weighted emissions of benzene, 1,3-butadiene, formaldehyde and acetaldehyde is a parameter defined in the CARB regulations in an attempt to quantify the overall toxicity of these gasoline exhaust components.

Under the CARB regulations, the predicted emissions values are calculated using a "predictive model," which comprises a complex set of formulae designed to predict the exhaust emissions from gasolines burned in "typical" California motor vehicles.

An acceptable alternative specification must set flat limits and/or averaging limits for each of the parameters set forth in Table 1. In evaluating whether a proposed ("test") alternative specification can be deemed acceptable under the CARB regulations, the refiner must apply the predictive model to the alternative specification and compare the predicted emissions to the predicted emissions from a corresponding reference specification. In making this comparison, the refiner must use a "corresponding" reference specification, wherein flat limits are used for all parameters for which the alternative specification uses a flat limit, and averaging limits are used for all parameters for which the alternative specification uses an averaging limit.

As will be readily apparent to those of skill in the art, the CARB regulations grant the California refiner considerable additional flexibility in the operation of its refinery. It should also be obvious to those skilled in the art, however, that the requirement that alternative specifications using averaging limits (which must meet or better reference blends having the more stringent averaging limits) requires an overall more costly refining operation than if the refiner could operate to alternative specifications using flat limits only. It is the purpose of the invention to provide a method by which the refiner can, with relative comfort and predictability, operate to an alternative specification which uses flat limits only.

In a typical application of the method, a gasoline refiner conducts refining operations in its traditional way, preparing its gasoline products using traditional blending recipes and techniques. However, the refiner further controls the blending operation so that each resultant gasoline blend meets the controlling criteria of the outside governing authority. Typically this is most efficiently accomplished by inserting a suitable sub-routine into the refiner's existing blending control computer software. After the blending operation is complete, the refiner confirms that the blend conforms to at least one alternative specification acceptable to the outside governing authority. When this is done, the alternative specification is reported to the outside governing agency, and the blend is shipped to market.

Using the method of the invention, therefore, the refiner can comfortably operate to "flat" specification limits set by the governing authority. The refiner does not have to resort to the use of averaging techniques—with their concomitant more limiting standards.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A method of manufacturing a chemical mixture which conforms to a set of regulations, wherein the mixture comprises a plurality of chemical components and wherein the mixture has a plurality of chemical characteristics, the set of regulations requiring that the manufacturer prepare a master specification which sets control limits on the chemical characteristics of the chemical mixture and requiring that the master specification conform to a set of controlling criteria which are dependent upon such control limits, the method comprising the steps of:

(a) blending quantities of chemical components to create a chemical mixture conforming to the controlling criteria;

(b) analyzing the chemical mixture to determine the chemical characteristics of the chemical mixture;

(c) preparing a test specification which conforms to the chemical characteristics of the chemical mixture;

(d) determining whether the test specification conforms to the controlling criteria;

(e) accepting the test specification as the master specification if the determination in step (d) is positive.

2. The method of claim 1 wherein the chemical mixture is a liquid mixture.

3. The method of claim 1 wherein the chemical mixture is a gasoline blend.

4. The method of claim 3 wherein the set of regulations requires the manufacturer to prepare a master specification which sets control limits on chemical characteristics of the chemical mixture selected from the list of characteristics consisting of sulfur content, benzene content, total aromatics content, total olefin content, oxygen content, T50 and T90.

5. The method of claim 3 wherein the controlling criteria critical comprise at least one estimate of an exhaust emission parameter.

6. The method of claim 3 wherein the controlling criteria critical comprise an estimate of the $NO_x$ emissions from combusting the blend in an internal combustion engine.

7. The method of claim 3 wherein the controlling criteria critical comprise an estimate of the total hydrocarbon emissions from combusting the blend in an international combustion engine.

8. The method of claim 3 wherein the controlling criteria critical comprise an estimate of the total toxic emissions from combusting the blend in an international combustion engine.

9. The method of claim 8 wherein the estimate of the total toxic emissions from the blend comprises an estimate of the emissions of benzene, 1,3-butadiene, formaldehyde and acetaldehyde from combusting the blend in an international combustion engine.

10. A method of manufacturing a gasoline blend which conforms to a set of regulations, wherein the mixture comprises a plurality of chemical components and wherein the mixture has a plurality of chemical characteristics including sulfur content, benzene content, total aromatics content, olefin content, oxygen content, T50 and T90, the set of regulations requiring that the manufacturer prepare a master specification which sets control limits on the chemical characteristics of the chemical mixture and requiring that the master specification conform to a set of controlling criteria which are dependent upon such control limits, the method comprising the steps of:

(a) blending quantities of chemical components to create a chemical mixture conforming to the controlling criteria;

(b) analyzing the chemical mixture to determine the chemical characteristics of the chemical mixture;

(c) preparing a test specification which conforms to the chemical characteristics of the chemical mixture;

(d) determining whether the test specification conforms to the controlling criteria;

(e) accepting the test specification as the master specification if the determination in step (d) is positive.

11. The method of claim 10 wherein the controlling criteria critical comprise at least one estimate of an exhaust emission parameter.

12. The method of claim 10 wherein the controlling criteria critical comprise an estimate of the $NO_x$ emissions from combusting the blend in an internal combustion engine.

13. The method of claim 10 wherein the controlling criteria critical comprise an estimate of the total hydrocarbon emissions from combusting the blend in an internal combustion engine.

14. The method of claim 10 wherein the controlling criteria critical comprise an estimate of the total toxic emissions from combusting the blend in an internal combustion engine.

15. The method of claim 14 wherein the estimate of the total toxic emissions from the blend comprises an estimate of the emissions of benzene, 1,3-butadiene, formaldehyde and acetaldehyde from combusting the blend in an internal combustion engine.

* * * * *